United States Patent
Price et al.

(10) Patent No.: US 11,027,487 B2
(45) Date of Patent: Jun. 8, 2021

(54) FUNCTIONAL SURFACE COATING METHODS FOR ADDITIVELY MANUFACTURED PRODUCTS

(71) Applicant: Carbon, Inc., Redwood City, CA (US)

(72) Inventors: R. Griffin Price, Redwood City, CA (US); Raymond C. Pederkoff, Daly City, CA (US); Matthew S. Menyo, San Francisco, CA (US)

(73) Assignee: CARBON, INC., Redwood City, CA (US)

( * ) Notice: Subject to any disclaimer, the term of this patent is extended or adjusted under 35 U.S.C. 154(b) by 0 days.

(21) Appl. No.: 16/982,163

(22) PCT Filed: Mar. 22, 2019

(86) PCT No.: PCT/US2019/023512
§ 371 (c)(1),
(2) Date: Sep. 18, 2020

(87) PCT Pub. No.: WO2019/190902
PCT Pub. Date: Oct. 3, 2019

(65) Prior Publication Data
US 2021/0023780 A1    Jan. 28, 2021

Related U.S. Application Data

(60) Provisional application No. 62/648,644, filed on Mar. 27, 2018.

(51) Int. Cl.
| | |
|---|---|
| *B05D 1/12* | (2006.01) |
| *B05D 1/24* | (2006.01) |
| *B29C 71/02* | (2006.01) |
| *C08J 7/02* | (2006.01) |
| *C08J 7/04* | (2020.01) |
| *C08J 7/044* | (2020.01) |
| *C08J 7/06* | (2006.01) |
| *C23C 24/04* | (2006.01) |
| *F26B 3/00* | (2006.01) |
| *F26B 5/00* | (2006.01) |
| *F26B 5/14* | (2006.01) |
| *F26B 5/16* | (2006.01) |
| *B29C 64/165* | (2017.01) |
| *B33Y 10/00* | (2015.01) |
| *B33Y 80/00* | (2015.01) |

(Continued)

(52) U.S. Cl.
CPC ......... *B29C 64/165* (2017.08); *B29C 64/124* (2017.08); *B29C 64/129* (2017.08); *B29C 64/135* (2017.08); *B29C 64/188* (2017.08); *B29C 71/0009* (2013.01); *B33Y 10/00* (2014.12); *B33Y 40/20* (2020.01); *B33Y 70/10* (2020.01); *B33Y 80/00* (2014.12); *B05D 3/0218* (2013.01); *B05D 2201/02* (2013.01); *B05D 2401/32* (2013.01); *B29C 2071/0018* (2013.01); *B29C 2071/0045* (2013.01); *B29K 2049/00* (2013.01); *B29K 2063/00* (2013.01)

(58) Field of Classification Search
CPC .......... B05D 1/12; B05D 1/24; B05D 3/0218; B05D 2201/02; B05D 2401/32; B08B 1/00; B08B 3/00; B08B 3/08; B29C 64/124; B29C 64/129; B29C 64/135; B29C 71/0009; B29C 71/02; B29C 2071/0018; B29C 2071/0045; B29K 2049/00; B29K 2063/00; B33Y 10/00; B33Y 70/00; C08J 7/02; C08J 7/04; C08J 7/044; C08J 7/06; C23C 24/04; F26B 3/00; F26B 5/00; F26B 5/14; F26B 5/16
USPC ..... 264/131, 236, 331.12, 331.19, 340, 341, 264/401; 427/180, 185, 314, 372.2, 427/383.1, 397.7, 400; 34/329, 443; 134/1
See application file for complete search history.

(56) References Cited

U.S. PATENT DOCUMENTS

| | | |
|---|---|---|
| 3,503,783 A | 3/1970 | Evans |
| 4,460,737 A | 7/1984 | Evans et al. |

(Continued)

FOREIGN PATENT DOCUMENTS

| | | |
|---|---|---|
| WO | 03035353 A1 | 5/2003 |
| WO | 2015164234 A1 | 10/2015 |

(Continued)

OTHER PUBLICATIONS

International Search Report and Written Opinion corresponding to PCT/US2018/023512; dated May 31, 2019 (10 pages).

(Continued)

*Primary Examiner* — Leo B Tentoni
(74) *Attorney, Agent, or Firm* — Myers Bigel, P.A.

(57) ABSTRACT

Provided is a method of making a coated object, which may include stereolithographically producing a green intermediate object from a dual cure polymerizable resin, the intermediate object containing uncured polymerizable material therein; then, optionally cleaning the green object; then, in any order: coating at least one surface portion of the object with a particulate material; and heating the object sufficiently to further cure the object; the coating and/or heating steps carried out under conditions in which uncured polymerizable material sweats (or exudes) to the surface of said object, and wherein the uncured polymerizable material contacts the particulate material, polymerizes, and bonds the particulate material to the surface of the object during the coating and/or heating steps. Also provided is a coated object produced by the method.

20 Claims, No Drawings

(51) Int. Cl.
    *B29C 64/188*     (2017.01)
    *B29C 64/135*     (2017.01)
    *B33Y 40/20*     (2020.01)
    *B33Y 70/10*     (2020.01)
    *B29C 64/124*     (2017.01)
    *B29C 71/00*     (2006.01)
    *B29C 64/129*     (2017.01)
    *B05D 3/02*     (2006.01)
    *B29K 63/00*     (2006.01)

(56) References Cited

U.S. PATENT DOCUMENTS

| | | | |
|---|---|---|---|
| 4,785,075 A | 11/1988 | Shimp | |
| 5,234,636 A | 8/1993 | Hull et al. | |
| 5,236,637 A | 8/1993 | Hull | |
| 5,391,072 A | 2/1995 | Lawton et al. | |
| 5,506,007 A | 4/1996 | Williams et al. | |
| 5,529,473 A | 6/1996 | Lawton et al. | |
| 5,955,513 A | 9/1999 | Hare | |
| 6,063,206 A | 5/2000 | Latta | |
| 6,552,104 B1 | 4/2003 | Hare | |
| 7,183,248 B2 | 2/2007 | Manning | |
| 7,438,846 B2 | 10/2008 | John | |
| 7,892,474 B2 | 2/2011 | Shkolnik et al. | |
| 7,897,558 B1 | 3/2011 | Arafat | |
| 8,110,135 B2 | 2/2012 | El-Siblani | |
| 8,765,108 B2 | 7/2014 | Lalleman | |
| 8,765,659 B2 | 7/2014 | Gizaw et al. | |
| 9,023,782 B2 | 5/2015 | Peitersen et al. | |
| 9,068,152 B2 | 6/2015 | Klinkhammer et al. | |
| 9,095,787 B2 | 8/2015 | Panandiker et al. | |
| 9,120,997 B2 | 9/2015 | Sadlowski et al. | |
| 9,121,000 B2 | 9/2015 | Burkinshaw et al. | |
| 9,175,248 B2 | 11/2015 | Klinkhammer et al. | |
| 9,198,847 B2 | 12/2015 | Peffly et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,394,092 B2 | 7/2016 | Lee et al. | |
| 9,453,142 B2 | 9/2016 | Rolland et al. | |
| 9,550,857 B2 | 1/2017 | Elizalde et al. | |
| 9,598,606 B2 | 3/2017 | Rolland et al. | |
| 9,676,963 B2 | 6/2017 | Rolland et al. | |
| 2013/0292862 A1 | 11/2013 | Joyce | |
| 2013/0295212 A1 | 11/2013 | Chen et al. | |
| 2013/0330470 A1* | 12/2013 | Gersch | B05D 1/12 |
| | | | 427/180 |
| 2015/0331402 A1 | 11/2015 | Lin et al. | |
| 2015/0360419 A1 | 12/2015 | Willis et al. | |
| 2016/0168511 A1 | 6/2016 | Hitchcock et al. | |
| 2016/0288376 A1 | 10/2016 | Sun et al. | |
| 2017/0129167 A1 | 5/2017 | Castanon | |
| 2017/0129169 A1 | 5/2017 | Batchelder et al. | |
| 2017/0174827 A1 | 6/2017 | Gu et al. | |
| 2018/0126630 A1 | 5/2018 | Panzer et al. | |
| 2018/0243976 A1 | 8/2018 | Feller | |
| 2018/0290374 A1 | 10/2018 | Willis et al. | |

FOREIGN PATENT DOCUMENTS

| | | |
|---|---|---|
| WO | 2016123506 A1 | 8/2016 |
| WO | 2016133759 A1 | 8/2016 |
| WO | 2016145182 A1 | 9/2016 |

OTHER PUBLICATIONS

Janusziewicz et al., "Layerless Fabrication with Continuous Liquid Interface Production", PNAS, 113 (42), 2016, 11703-11708.

Mishra et al., "A Review on Various Techniques of Microencapsulation", Int J of Pharmaceutical and Chem Sciences, 2(2), 2013, 962-977.

Poelma et al., "Rethinking digital manufacturing with polymers", Science, 358(6369), 2017, 1384-1385.

Tumbleston et al., "Continuous Liquid Interface Production of 3D Objects", Science, 347(6228), 2015, 1349-1352.

\* cited by examiner

FUNCTIONAL SURFACE COATING METHODS FOR ADDITIVELY MANUFACTURED PRODUCTS

CROSS REFERENCE TO RELATED APPLICATIONS

This application is a 35 U.S.C. § 371 national phase application of International Application Serial No. PCT/US2019/023512, filed Mar. 22, 2019, which claims priority to U.S. Provisional Application Ser. No. 62/648,644, filed Mar. 27, 2018, the entire contents of which are hereby incorporated by reference.

FIELD OF THE INVENTION

The present invention concerns additive manufacturing, and particularly concerns methods of making additively manufactured objects with functional coatings on surfaces thereof.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique sometimes referred to as continuous liquid interface production (CLIP) has expanded the usefulness of stereolithography from prototyping to manufacturing. See J. Tumbleston, D. Shirvanyants, N. Ermoshkin et al., *Continuous liquid interface production of 3D objects*, SCIENCE 347, 1349-1352 (published online 16 Mar. 2015); U.S. Pat. Nos. 9,211,678; 9,205,601; and 9,216,546 to DeSimone et al.; see also R. Janusziewicz, et al., *Layerless fabrication with continuous liquid interface production*, PNAS 113, 11703-11708 (18 Oct. 2016).

Dual cure resins for additive manufacturing were introduced shortly after the introduction of CLIP, expanding the usefulness of stereolithography for manufacturing a broad variety of objects still further. See Rolland et al., U.S. Pat. Nos. 9,676,963, 9,453,142 and 9,598,606; J. Poelma and J. Rolland, *Rethinking digital manufacturing with polymers*, SCIENCE 358, 1384-1385 (15 Dec. 2017).

The introduction of CLIP, the introduction of dual cure resins, and the recognition of the diverse variety of objects that can be conveniently produced thereby, has created a need for new techniques for imparting functional surface coatings to such objects.

SUMMARY OF THE INVENTION

A method of making a coated object is described herein, which includes the steps of:

stereolithographically producing a green intermediate object from a dual cure polymerizable resin, the intermediate object containing uncured polymerizable material therein; then, optionally cleaning the green object; then, in any order:
coating at least one surface portion of the object with a particulate material; and heating the object sufficiently to further cure the object; the coating and/or heating steps carried out under conditions in which uncured polymerizable material sweats (or exudes) to the surface of said object, and wherein the uncured polymerizable material contacts the particulate material, polymerizes, and bonds the particulate material to the surface of the object during the coating and/or heating steps.

In some embodiments, the producing step is carried out by bottom-up stereolithography (e.g., continuous liquid interface production).

In some embodiments, the polymerizable resin comprises:
(a) a cyanate ester dual cure resin; or
(b) an epoxy dual cure resin (for example, a dual cure resin comprising:
  (i) low viscosity epoxy monomers (examples of which include but are not limited to, bisphenol F diglycidyl ether, bisphenol A diglycidyl ether, 1,4 butanediol diglycidyl ether, 2-ethylhexyl glycidyl ether, cyclohexanedimethanol diglycidylether, cresyl glycidyl ether, neopentyl glycol diglycidylether, p-tertiary-butylphenol glycidyl ether, 4,4'-methylenebis(N,N-diglycidylaniline), trimethylolpropane triglycidylether, aliphatic monofunctional glycidyl ethers, most preferably C8-C14 glycidyl ethers, those derived from unsaturated natural product fatty acids, including cashew nut shell liquid, etc.);
  (ii) a low surface energy epoxy monomer (examples of which include but are not limited to those derived from dicyclopentadiene and phenol, including EPOKUKDO KDCP-100 epoxy resin and fluorinated epoxies, including bisphenol AF diglycidyl ether, etc.); and/or
  (iii) from 20 or 30 percent by weight to 50 or 60 percent by weight of epoxy monomer).

In some embodiments, the heating step precedes the coating step, and the coating step is carried out by contacting the object to a fluidized (e.g., aerated) bed of the particulate material. In some embodiments, the heating step follows the coating step, and the coating step is carried out by spraying the object with said particulate material (optionally but preferably in dry powder form).

In some embodiments, the cleaning step is carried out by blowing, wiping, contacting the object to an absorbent material, contacting the object to a solvent, or a combination thereof.

In some embodiments, the particulate material comprises, consists of, or consists essentially of an organic material. In some embodiments, the particulate material comprises, consists of, or consists essentially of an inorganic material.

In some embodiments, the particulate material has an average particle diameter of from 1 or 2 microns, to 100 or 200 microns, or more.

In some embodiments, the particulate material comprises, consists of, or consists essentially of metal particles (e.g., iron, nickel, cobalt, aluminum, gold, platinum, silver, copper, etc., including alloys thereof).

In some embodiments, the particulate material comprises, consists of, or consists essentially of ceramic particles or ceramic composite (e.g., cermet) particles (e.g., particles of boron carbide, boron oxide, boron nitride, sialon, silicon carbide, silicon nitride, steatite, titanium carbide, zinc oxide, zirconium dioxide, barium titanate, strontium titanate, silica such as fumed silica, porcelain, glass microspheres, etc., including combinations thereof).

In some embodiments, the particulate material comprises, consists of, or consists essentially of ferromagnetic particles (e.g., iron oxide particles).

In some embodiments, the particulate material comprises, consists of, or consists essentially of dry lubricant particles (e.g., graphite particles, molybdenum disulfide particles, polytetrafluoroethylene particles, ceramic powder dry lubricant particles such as hexagonal boron nitride, etc., including combinations thereof).

In some embodiments, the particulate material comprises, consists of, or consists essentially of carbon nano tubes.

In some embodiments, the particulate material comprises, consists of, or consists essentially of, microcapsules. In some embodiments, the microcapsules have a solid or liquid inner core (e.g., the core comprising, consisting of, or consisting essentially of a pigment or dye (such as a thermochromic, fluorescent, or luminescent pigment), an adhesive, a fragrance, a phase change material (for thermal regulation); a pesticide, a herbicide, a microbicide, a drug, etc.). In some embodiments, the microcapsules are polymer microcapsules, for example having an outer wall formed from a natural or synthetic, inert or biodegradable, polymer (e.g., polyvinyl alcohol, styrene-butadiene latex, gelatin, gum arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, poly methyl methacrylate (PMMA), acrolein, glycidyl methacrylate epoxy polymers, etc., including copolymers and combinations thereof). In some embodiments, the microcapsules have a metallic outer wall, optionally formed or plated over a polymer inner wall (for example, an inner wall formed from a polymer such as described above).

A further aspect of the invention is a coated object produced by a method as described herein.

U.S. Pat. Nos. 4,460,737, 5,955,513, and 6,552,104 all describe the sweating out of constituents from a polymer, but as an undesired property to be avoided or controlled.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

1. Production by Additive Manufacturing.

Dual cure resins for additive manufacturing are known and described in, for example, Rolland et al., U.S. Pat. Nos. 9,676,963; 9,598,606; and 9,453,142, the disclosures of which are incorporated herein by reference. Suitable examples include, but are not limited to, resins for producing parts comprised of polymers such as epoxy, cyanate ester, etc., that are formed from a heat polymerizable component, and the resin further comprises light-polymerizable components that photopolymerize during additive manufacturing to form a "green" or "intermediate" three-dimensional object.

Resins can be tuned by selection and amount of constituent ingredients to enhance sweating during the heating step. For example, for an epoxy dual cure resin, the resin may comprise:

(i) low viscosity epoxy monomers (examples of which include but are not limited to, bisphenol F diglycidyl ether, bisphenol A diglycidyl ether, 1,4 butanediol diglycidyl ether, 2-ethylhexyl glycidyl ether, cyclohexanedimethanol diglycidylether, cresyl glycidyl ether, neopentyl glycol diglycidylether, p-tertiarybutylphenol glycidyl ether, 4,4'-methylenebis(N,N-diglycidylaniline), trimethylolpropane triglycidylether, aliphatic monofunctional glycidyl ethers, most preferably C8-C14 glycidyl ethers, those derived from unsaturated natural product fatty acids, including cashew nut shell liquid, etc.);

(ii) a low surface energy epoxy monomer (examples of which include but are not limited to those derived from dicyclopentadiene and phenol, including EPOKUKDO KDCP-100 multifunctional epoxy resin (Kukdo Chemical Co., Ltd., Seoul, Korea) and fluorinated epoxies, including bisphenol AF diglycidyl ether, etc.); and/or (iii) from 20 to 30 percent by weight to 50 or 60 percent by weight of epoxy monomer.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the intermediate object is formed by continuous liquid interface production (CLIP). CLIP is known and described in, for example, U.S. Pat. Nos. 9,211,678; 9,205,601, 9,216,546, and in J. Tumbleston, D. Shirvanyants, N. Ermoshkin et al., Continuous liquid interface production of 3D Objects, Science 347, 1349-1352 (2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234), generating oxygen as an inhibitor by electrolysis (see I. Craven et al., WO 2016/133759), and incorporating magnetically positionable particles to which the photoactivator is coupled into the polymerizable liquid (see J. Rolland, WO 2016/145182).

Other examples of methods and apparatus for carrying out CLIP include, but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., Continuous liquid interface production system with viscosity pump, US Patent Application Pub. No. US 2017/0129169; Sun and Lichkus, Three-dimensional fabricating system for rapidly producing objects, US Patent Application Pub. No. US 2016/0288376; Willis et al., 3d print adhesion reduction during cure process, US Patent Application Pub. No. US 2015/0360419; Lin et al., Intelligent 3d printing through optimization of 3d print parameters, US Patent Application Pub. No. US 2015/0331402; and D. Castanon, Stereolithography System, US Patent Application Pub. No. US 2017/0129167.

2. Cleaning/Washing.

Where necessary, green or intermediate objects as described above can be cleaned in any suitable manner, such as by wiping (with a rigid or flexible wiper, fabric, or compressed gas such as compressed air), washing, contacting to an absorbent material (e.g., absorbent pads or wipes, granular absorbent materials such as those comprised of diatomaceous earth and/or montmorillonite clay), or combinations thereof.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009).

Examples of alcohol organic solvents that may be used in the present invention include, but are not limited to, aliphatic and aromatic alcohols such as 2-ethyl hexanol, glycerol, cyclohexanol, ethylene glycol, propylene glycol, di-propylene glycol, 1,4-butanediol, isoamyl alcohol, 1,2-propanediol, 1,3-propanediol, benzyl alcohol, 2-pentanol, 1-butanol, 2-butanol, methanol, ethanol, t-butanol, 2-propanol, 1-propanol, 2-methoxyethanol, tetrahydrofuryl alcohol, benzyl alcohol, etc., including combinations thereof. In some embodiments, a C1-C6 or C1-C4 aliphatic alcohol is preferred.

Examples of ester organic solvents that may be used to carry out the present invention include, but are not limited to, t-butyl acetate, n-octyl acetate, butyl acetate, ethylene carbonate, propylene carbonate, butylenes carbonate, glycerol carbonate, isopropyl acetate, ethyl lactate, propyl acetate, dimethyl carbonate, methyl lactate, ethyl acetate, ethyl propionate, methyl acetate, ethyl formate etc., including combinations thereof.

Examples of dibasic ester organic solvents include, but are not limited to, dimethyl esters of succinic acid, glutaric acid, adipic acid, etc., including combinations thereof.

Examples of ketone organic solvents that may be used to carry out the present invention include, but are not limited to, cyclohexanone, cyclopentanone, 2-pentanone, 3-pentanone, methylisobutyl ketone, acetone, methylethyl ketone, etc., including combinations thereof.

Examples of acid organic solvents that may be used to carry out the present invention include, but are not limited to, propionic acid, acetic anhydride, acetic acid, etc., including combinations thereof.

Examples of aromatic organic solvents that may be used to carry out the present invention include, but are not limited to, mesitylene, cumene, p-xylene, toluene, benzene, etc., including combinations thereof.

Examples of hydrocarbon (i.e., aliphatic) organic solvents that may be used to carry out the present invention include, but are not limited to, cis-decalin, ISOPAR™ G, isooctane, methyl cyclohexane, cyclohexane, heptane, pentane, methylcyclopentane, 2-methylpentane, hexane, petroleum spirit, etc., including combinations thereof.

Examples of ether organic solvents that may be used to carry out the present invention include, but are not limited to, di(ethylene glycol), ethoxybenzene, tri(ethylene glycol), sulfolane, DEG monobutyl ether, anisole, diphenyl ether, dibutyl ether, t-amyl methyl ether, t-butylmethyl ether, cyclopentyl methyl ether, t-butyl ethyl ether, 2-methyltetrahydrofuran, diethyl ether, bis(2-methoxyethyl) ether, dimethyl ether, 1,4-dioxane, tetrahydrofuran, 1,2-dimethoxyethane, diisopropyl ether, etc., including combinations thereof.

Examples of dipolar aprotic organic solvents that may be used to carry out the present invention include, but are not limited to, dimethylpropylene urea, dimethyl sulphoxide, formamide, dimethyl formamide, N-methylformamide, N-methyl pyrrolidone, propanenitrile, dimethyl acetamide, acetonitrile, etc., including combinations thereof.

Examples of halogenated organic solvents that may be used to carry out the present invention include, but are not limited to, 1,2-dichlorobenzene, 1,2,4-trichlorobenzene, chlorobenzene, trichloroacetonitrile, chloroacetic acid, trichloroacetic acid, perfluorotoluene, perfluorocyclohexane, carbon tetrachloride, dichloromethane, perfluorohexane, fluorobenzene, chloroform, perfluorocyclic ether, trifluoroacetic acid, trifluorotoluene, 1,2-dichloroethane, 2,2,2-trifluoroethanol, etc., including combinations thereof.

Examples of base organic solvents that may be used to carry out the present invention include, but are not limited to, N,N-dimethylaniline, triethylamine, pyridine, etc., including combinations thereof.

Examples of other organic solvents that may be used to carry out the present invention include, but are not limited to, nitromethane, carbon disulfide, etc., including combinations thereof.

Examples of surfactants include, but are not limited to, anionic surfactants (e.g., sulfates, sulfonates, carboxylates, and phosphate esters), cationic surfactants, zwitterionic surfactants, nonionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof. Numerous examples additional examples of suitable surfactants are known, some of which are described in U.S. Pat. Nos. 9,198,847, 9,175,248, 9,121,000, 9,120,997, 9,095,787, 9,068,152, 9,023,782, and 8,765,108.

Examples of chelants (chelating agents) include, but are not limited to, ethylenediamine tetraacetic acid, phosphates, nitrilotriacetic acid (NTA), citrates, silicates, and polymers of acrylic and maleic acid.

Examples of enzymes that may be included in the wash liquid include, but are not limited to, proteases, amylases, lipases, cellulases, etc., including mixtures thereof. See, e.g., U.S. Pat. Nos. 7,183,248 and 6,063,206.

In some embodiments, the wash liquid can be an aqueous solution of ethoxylated alcohol, sodium citrate, tetrasodium N,N-bis(carboxymethyl)-L-glutamate, sodium carbonate, citric acid, and isothiazolinone mixture. One particular example thereof is SIMPLE GREEN® all purpose cleaner (Sunshine Makers Inc., Huntington Beach, Calif., USA), used per se or mixed with additional water.

In some embodiments, the wash liquid can be an aqueous solution comprised of of 2-butoxyethanol, sodium metasilicate, and sodium hydroxide. One particular example thereof is PURPLE POWER™ degreaser/cleaner (Aiken Chemical Co., Greenville, S.C., USA), used per se or mixed with additional water.

In some embodiments, the wash liquid can be ethyl lactate, alone or with a co-solvent. One particular example thereof is BIO-SOLV™ solvent replacement (Bio Brands LLC, Cinnaminson, N.J., USA), used per se or mixed with water.

In some embodiments, the wash liquid consists of a 50:50 (volume:volume) solution of water and an alcohol organic solvent such as isopropanol (2-propanol).

Examples of hydrofluorocarbon solvents that may be used to carry out the present invention include, but are not limited to, 1,1,1,2,3,4,4,5,5,5-decafluoropentane (Vertrel® XF, DuPont™ Chemours), 1,1,1,3,3-pentafluoropropane, 1,1,1,3,3-pentafluorobutane, etc.

Examples of hydrochlorofluorocarbon solvents that may be used to carry out the present invention include, but are not limited to, 3,3-dichloro-1,1,1,2,2-pentafluoropropane, 1,3-dichloro-1,1,2,2,3-pentfluoropropane, 1,1-dichloro-1-fluoroethane, etc., including mixtures thereof.

Examples of hydrofluoroether solvents that may be used to carry out the present invention include, but are not limited to, methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc., including mixtures thereof. Commercially available examples of this solvent include Novec 7100 (3M), Novec 7200 (3M).

Examples of volatile methylsiloxane solvents that may be used to carry out the present invention include, but are not limited to, hexamethyldisiloxane (OS-10, Dow Corning), octamethyltrisiloxane (OS-20, Dow Corning), decamethyltetrasiloxane (OS-30, Dow Corning), etc., including mixtures thereof.

Other siloxane solvents (e.g., NAVSOLVE™ solvent) that may be used to carry out the present invention include but are not limited to those set forth in U.S. Pat. No. 7,897,558.

Depending on factors such as the combination of techniques chosen for the cleaning step, the duration and temperature of contact of the object to any wash liquid that may be used, and the like, more mild wash liquids may be preferred to avoid unduly depleting the green object of polymerizable constituents that might otherwise advantageously sweat out from the object. For example, wash liquids comprised of isopropanol may be diluted with propylene glycol (e.g., up to 30, 40, 50, or 60 percent by weight) to provide a less aggressive wash liquid, or the wash liquid may be comprised entirely or almost entirely of propylene glycol (e.g., at least 70, 80 or 90 percent by weight). Of course, where wash liquids are not used (i.e., the cleaning step is carried out entirely by wiping, blowing, and/or contacting to an absorbent material), aggressiveness of wash liquid is not a concern.

When the cleaning step imparts ingredients to the surface of the object that are not desired for carrying into the coating and/or further curing step (such as from a particulate absorbent and/or a wash liquid), in some embodiments the cleaning step can be followed with a further rinsing step (e.g., with distilled and/or deionized water), wiping step, and/or blowing step.

3. Surface Coating.

Any of a variety of different particulate materials can be used for surface coating. In some embodiments, the particulate material comprises, consists of, or consists essentially of an organic material.

In some embodiments, the particulate material comprises, consists of, or consists essentially of an inorganic material.

In some embodiments, the particulate material has an average particle diameter of from 1 or 2 microns, to 100 or 200 microns, or more.

In some embodiments, the particulate material comprises, consists of, or consists essentially of metal particles (e.g., iron, nickel, cobalt, aluminum, gold, platinum, silver, copper, etc., including alloys thereof).

In some embodiments, the particulate material comprises, consists of, or consists essentially of ceramic particles or ceramic composite (e.g., cermet) particles (e.g., particles of boron carbide, boron oxide, boron nitride, sialon, silicon carbide, silicon nitride, steatite, titanium carbide, zinc oxide, zirconium dioxide, barium titanate, strontium titanate, silica such as fumed silica, porcelain, glass microspheres, etc., including combinations thereof).

In some embodiments, the particulate material comprises, consists of, or consists essentially of ferromagnetic particles (e.g., iron oxide particles).

In some embodiments, the particulate material comprises, consists of, or consists essentially of dry lubricant particles (e.g., graphite particles, molybdenum disulfide particles, polytetrafluoroethylene particles; ceramic powder dry lubricant particles such as hexagonal boron nitride, etc., including combinations thereof).

In some embodiments, the particulate material comprises, consists of, or consists essentially of carbon nanotubes.

In some embodiments, the particulate material comprises, consists of, or consists essentially of microcapsules. For example, in some embodiments the microcapsules have a solid or liquid inner core (e.g., the core comprising, consisting of, or consisting essentially of a pigment or dye (such as a thermochromic, fluorescent, or luminescent pigment), an adhesive, a fragrance, a phase change material (for thermal regulation); a pesticide, a herbicide, a microbicide, a drug, etc.). In some embodiments, the microcapsules are polymer microcapsules, for example having an outer wall formed from a natural or synthetic, inert or biodegradable, polymer (e.g., polyvinyl alcohol, styrene-butadiene latex, gelatin, gum arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/ dimethylaminoethyl methacrylate, poly methyl methacrylate (PMMA), acrolein, glycidyl methacrylate epoxy polymers, etc., including copolymers and combinations thereof. In some embodiments, the microcapsules have a metallic outer wall, optionally formed or plated over a polymer inner wall (for example, an inner wall formed from a polymer such as described above). The production of a variety of different microspheres is known in the art. See, e.g., U.S. Pat. Nos. 8,765,659; 9,394,092; 9,550,857; and 3,503,783; US Patent Application Publication No. US 2016/0168511; and D. Mishra et al., A Review on Various Techniques of Microencapsulation, International Journal of Pharmaceutical and Chemical Sciences 2, 962-977 (2013).

Coating can be carried out by any suitable technique, before, during and/or after the heating step as appropriate.

For example, in some embodiments, the heating step can precede the coating step, and the coating step is carried out by contacting the object to a fluidized (e.g., aerated) bed of the particulate material.

In other embodiments, the heating step follows the coating step, and the coating step is carried out by spraying the object with the particulate material (optionally but preferably in dry powder form). Numerous other coating techniques will be apparent to those skilled in the art.

4. Further Curing/Baking.

Heating or baking of the object may be before or after the surface coating step, as noted above.

Heating may be active heating (e.g., in an oven, such as an electric, gas, solar oven or microwave oven, heated bath, or combination thereof), or passive heating (e.g., at ambient (room) temperature). Active heating will generally be more rapid, and conducive to sweating, than passive heating and is typically preferred, but passive heating—such as simply maintaining the intermediate at ambient temperature for a sufficient time to effect further cure—may in some embodiments be employed.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. As an example, the intermediate may be heated in a stepwise manner to temperature of about 50° C. to about 80° C., and then to a temperature of about 90° C. to 100 or 110° C., and then to a temperature of about 115° C. to about 120 or 130° C., and then to a temperature of 150° C. to 170 or 180° C., and then to a temperature of 190° C. to 200 or 210° C., and then to a temperature of 210° C. to 220 or 230° C. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road, Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company)), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

In some embodiments, the heating step is preferably carried out over a time of at least 1, 2, 3 or 4 hours or more (to enhance sweating), and/or on a "ramped" schedule of gradually increasing temperatures, or over two or more stages (e.g., to a first elevated temperature at which sweating is achieved, and then a second temperature, higher than the first elevated temperature, at which the heat polymerization of the sweated constituents is enhanced). Particular heat schedules can be optimized based on factors such as specific resin type and ingredients, the size and shape of the objects being heated, and the like.

The present invention is explained in greater detail in the following non-limiting examples.

EXAMPLES

Uncured ("green") sample parts were produced from a cyanate ester dual cure additive manufacturing resin (available from Carbon, Inc. 1089 Mills Way, Redwood City, Calif. 94063 USA). After production, the green parts were cleaned by wiping them with a dry paper towel to remove excess uncured resin on the surface thereof. The parts were then placed in one of the powder coating materials listed below and manipulated therein until uniformly coated.

The following powder coating materials were used:
(1) Iron filings, fine (particle diameter approximately 40 micron);
(2) Magnetite (black iron oxide; $Fe_3O_4$) (particle diameter approximately 44 microns);
(3) Alnico iron alloy powder (particle diameter approximately 40 microns);
(4) Molybdenum disulfide (particle diameter 1.5 microns);
(5) PTFE polymer (TEFLON® polymer) (particle diameter approximately 2 to 3 microns);
(6) thermochromic pigment microcapsule particles (specifically, a leuco dye type pigment comprised of a mixture of leuco dyes, weak acids and salts in a polymer microcapsule having a diameter of approximately 3 microns, obtained from GlomaniaUSA, 8106 S. Spectrum Cove, Sandy, Utah 84093 USA);
(7) Boron carbide (particle diameter approximately 40 microns);
(8) Fumed silica (particle diameter approximately 3 microns);
(9) Graphite lubricant (particle diameter unknown); and
(10) Milled carbon fiber (100 micron long by 7 micron diameter rods).

Once uniformly coated with powder, excess powder was then dusted off of the parts, and the parts then baked in accordance with known bake schedules for cyanate ester resins, as follows (where temperatures given are oven temperatures): (i) Ramp from room temperature to 70° C. in 1 hour; (ii) Ramp from 70 to 100° C. in 2 hours; (iii) Hold at 100° C. for 3 hours; (iv) Ramp from 100 to 120° C. over 1 hour; (v) Hold at 120° C. for 30 minutes; (vi) Ramp from 120 to 180° C. over 2 hours; (vii) Hold at 180° C. for 1 hour; (viii) Ramp from 180 to 200° C. over 1 hour; (ix) Ramp from 200 to 220° C. over 1 hour; and then (x) Cool to room temperature in the oven with the oven door closed, and then remove.

Iron, iron oxide, PTFE polymer, graphite, and carbide powder coatings were tested on parts in the shape of a 20 mm×20 mm×2 mm rectangle. Molybdenum disulfide, Alnico iron alloy, thermochromatic pigment, and fumed silica were tested on parts in the shape of 25 mm long "dogbone" samples.

For all of the above powder materials, the powder materials were found to be adhered to the surface of the parts after baking. Additional properties of some of the materials were tested, as summarized in Table 1 below.

TABLE 1

| Particulate Material | Additional Observed Properties |
| --- | --- |
| Iron | No conductivity, mild magnetism, rough surface |
| Magnetite and Alnico iron alloy | Moderate magnetism, rough surface |
| Fumed Silica | Low surface energy, hydrophobia |
| Graphite | Decreased friction, mild sheet resistance |
| Molybdenum disulfide | Decreased friction |
| PTFE polymer | Decreased friction |
| Boron carbide | Not tested; intended to increase abrasion resistance. |
| Thermochromatic pigment | Partially degraded during bake but still thermochromatic |
| Carbon fiber | Not tested; intended to increase strength |

The foregoing is illustrative of the present invention, and is not to be construed as limiting thereof. The invention is defined by the following claims, with equivalents of the claims to be included therein.

We claim:
1. A method of making a coated object, comprising:
stereolithographically producing a green intermediate object from a dual cure polymerizable resin, wherein said polymerizable resin comprises: (a) a cyanate ester dual cure resin; or (b) an epoxy dual cure resin, said intermediate object containing uncured polymerizable material therein; then,
optionally cleaning said green object; then, in any order:
coating at least one surface portion of said object with a particulate material; and
heating said object sufficiently to further cure said object; said coating and/or heating steps carried out under conditions in which uncured polymerizable material sweats or exudes to the surface of said object, and
wherein the uncured polymerizable material contacts said particulate material, polymerizes, and bonds said particulate material to the surface of said object during said coating and/or heating steps.

2. The method of claim 1, wherein said producing step is carried out by bottom-up stereolithography.

3. The method of claim 1, wherein said polymerizable resin comprises the epoxy dual cure resin, said epoxy dual cure resin comprising:
(i) low viscosity epoxy monomers;
(ii) a low surface energy epoxy monomer; and/or
(iii) from 20 or 30 percent by weight to 50 or 60 percent by weight of epoxy monomer.

4. The method of claim 1, wherein
said heating step precedes said coating step, and said coating step is carried out by contacting said object to a fluidized bed of said particulate material.

5. The method of claim 1, wherein said cleaning step is carried out by blowing, wiping, contacting said object to an absorbent material, contacting said object to a solvent, or a combination thereof.

6. The method of claim 1, wherein said particulate material comprises an organic material.

7. The method of claim 1, wherein said particulate material comprises an inorganic material.

8. The method of claim 1, wherein said particulate material has an average particle diameter of from 1 micron to 200 microns.

9. The method of claim 1, wherein said particulate material comprises metal particles.

10. The method of claim 1, wherein said particulate material comprises ceramic particles or ceramic composite particles.

11. The method of claim 1, wherein said particulate material comprises ferromagnetic particles.

12. The method of claim 1, wherein said particulate material comprises dry lubricant particles.

13. The method of claim 1, wherein said particulate material comprises carbon nanotubes.

14. The method of claim 1, wherein said particulate material comprises microcapsules.

15. The method of claim 1, wherein said polymerizable resin comprises the cyanate ester dual cure resin.

16. The method of claim 1, wherein said producing step is carried out by continuous liquid interface production.

17. The method of claim 3, wherein the epoxy dual cure resin comprises a low viscosity epoxy monomer selected from the group consisting of: bisphenol F diglycidyl ether, bisphenol A diglycidyl ether, 1,4 butanediol diglycidyl ether, 2-ethylhexyl glycidyl ether, cyclohexanedimethanol diglycidylether, cresyl glycidyl ether, neopentyl glycol diglycidylether, p-tertiarybutylphenol glycidyl ether, 4,4'-methylenebis(N,N-diglycidylaniline), trimethylolpropane triglycidylether, and an aliphatic monofunctional glycidyl ether.

18. The method of claim 3, wherein the epoxy dual cure resin comprises a low surface energy epoxy monomer derived from dicyclopentadiene and phenol.

19. The method of claim 1, wherein said heating step follows said coating step, and said coating step is carried out by spraying said object with said particulate material.

20. The method of claim 1, wherein said particulate material comprises particles of boron carbide, boron oxide, boron nitride, sialon, silicon carbide, silicon nitride, steatite, titanium carbide, zinc oxide, zirconium dioxide, barium titanate, strontium titanate, silica, porcelain, glass microspheres, or a combination of two or more thereof.

* * * * *